US005979813A

United States Patent [19]
Mansbridge et al.

[11] Patent Number: 5,979,813
[45] Date of Patent: Nov. 9, 1999

[54] TAPE THREADING APPARATUS

[75] Inventors: Geoffrey W. Mansbridge; Jeffrey S. McAllister, both of Boise, Id.

[73] Assignee: Hewlett-Packard Company, Palo Alto, Calif.

[21] Appl. No.: 09/164,185

[22] Filed: Sep. 30, 1998

[51] Int. Cl.[6] .................................................. G03B 1/58
[52] U.S. Cl. .................................. 242/332.4; 242/332.7; 242/582
[58] Field of Search .............................. 242/332.4, 332.7, 242/332.8, 532.1, 532.6, 532.7, 582

[56] References Cited

U.S. PATENT DOCUMENTS

| | | |
|---|---|---|
| 628,909 | 7/1899 | Litten . |
| 3,297,272 | 1/1967 | Dekker . |
| 3,664,607 | 5/1972 | Trefzger et al. . |
| 3,848,263 | 11/1974 | Nagaoka ................................... 360/83 |
| 3,934,840 | 1/1976 | Inaga ....................................... 242/195 |
| 4,059,211 | 11/1977 | Brizzolara ................................ 226/11 |
| 4,330,096 | 5/1982 | Bartel et al. . |
| 4,335,858 | 6/1982 | Cranna ..................................... 242/195 |
| 4,662,049 | 5/1987 | Hetrich ..................................... 29/267 |
| 5,465,187 | 11/1995 | Hoge et al. .............................. 360/132 |
| 5,542,620 | 8/1996 | Ohshita ................................... 242/332.4 |

FOREIGN PATENT DOCUMENTS

| | | | |
|---|---|---|---|
| 1114950 | 6/1986 | Japan ................................. 242/532.6 |
| 4094814 | 3/1992 | Japan ................................. 242/532.6 |
| WO 98/44499 | 10/1988 | WIPO . | |

OTHER PUBLICATIONS

U.S. Pending application Ser. No. 09/010,418; filed Jan. 21, 1998; Geoffrey W. Mansbridge; "Tape Block And Take–Up Reel Assemly For A Magnetic Tape Transport System"; Attorney Docket No. 10971133–1.

U.S. Pending application Ser. No. 09/055,016; filed Apr. 3, 1998; James Eaton et al; "Tape Leader Pin Assembly And Method For Making The Same"; Attorney Docket No. SEA 2652.

U.S. Pending application Ser. No. 09/121,766; filed Jun. 23, 1998; Jeffrey S. McAllister et al; "Tape Threading Apparatus"; Attorney Docket No. 10980083–1.

*Primary Examiner*—Donald P. Walsh
*Assistant Examiner*—William A. Rivera
*Attorney, Agent, or Firm*—Matthew L. Wade

[57] ABSTRACT

A threading apparatus for threading tape from a single reel magnetic tape cartridge through a tape transport machine. The threading apparatus includes a leader block and a take-up reel. The take-up reel includes a leader block receiving section that is adapted to receive the leader block during a threading operation. Upon the take-up reel receiving the leader block, the take-up reel and leader block form a smooth winding substrate for subsequent wraps of magnetic tape.

13 Claims, 4 Drawing Sheets

TAPE THREADING APPARATUS

FIELD OF THE INVENTION

This invention relates to the field of tape and tape equipment, and more particularly to tape threading apparatus that works in conjunction with a single reel magnetic tape cartridge.

BACKGROUND OF THE INVENTION

For purposes of this application, a read or write operation of information to a magnetic tape is referred to in general as a "read-write" operation.

Data, programs, and other information are often read or stored to a magnetic tape (tape) by the use of a tape transport machine ("transport machine") that is able to perform read-write operations to the tape. Typically, these transport machines include one or more read-write heads and make use of two reels to transport the tape. In order to perform read-write operations to the tape, the tape is wound onto one reel while unwound from the other reel in a manner so that the tape is controllably moved through a guide positioned between the reels and in proximity to the heads.

Some transport machines are designed to operate with tape from a tape cartridge. When the tape cartridge is loaded, the transport machine can interface with tape in the cartridge in order to perform the desired read-write operations. After performing these operations, the transport machine allows the tape cartridge (with the tape) to be unloaded.

One common type of tape cartridge (alternatively referred to herein as a "single reel cartridge") houses tape wrapped onto a single reel (alternatively referred to herein as the "source reel"). Typically, transport machines designed to accept a single reel cartridge include a take-up reel and threading apparatus. Upon loading the cartridge into the transport machine, the threading apparatus operates to thread the tape appropriately through the transport machine and establish a connection with the take-up reel. Further transport of tape is then accomplished by the coordinated winding and unwinding of tape onto the take-up reel and source reel.

As is known in the art, it is highly desirable that the winding substrate (referred to herein as the "take-up reel winding substrate") for tape wrapped onto a take-up reel be acceptably smooth so that irregularities are not created in the tape. Irregularities in the tape can make read-write operations to the tape less reliable, especially in the area where the irregularity is present. In the case of high storage capacity tapes wherein data density on the tape is high, even a small irregularity can affect the reliability of a large amount of read-write operations to the tape.

One popular technique for threading tape from a single reel cartridge makes use of a leader block permanently connected to the free end of the tape in the cartridge. During a threading operation of a loaded single reel cartridge, threading apparatus (see, for example, U.S. Pat. No. 4,335,858 incorporated herein by reference) residing in the transport machine operates to move the leader block out of the cartridge and through a threading path in the transport machine in a manner so as to thread the tape. The threading apparatus further operates to insert the leader block into a slot in the take-up reel. When the leader block is so inserted, an exposed curved surface of the leader block and the outer cylindrical surface of the take-up reel form the take-up reel winding substrate. Thus, the smoothness of the take-up reel winding substrate is in part a function of a component (i.e., the tape cartridge leader block) of the loaded cartridge.

Typically, transport machines that make use of the threading technique just described can operate with single reel cartridges from a wide range of manufacturers. These manufactures may or may not include leader blocks in their tape cartridges that provide for an acceptably smooth take-up reel winding substrate. This situation can create unacceptable variations in transport machine reliability that are outside the control of the transport machine manufacturer.

SUMMARY OF THE INVENTION

The present invention provides a tape transport machine having threading apparatus that includes a take-up reel comprising a first curved surface and a leader block comprising a second curved surface. The leader block is adapted to establish a connection with a magnetic tape located in a single reel cartridge. The take-up reel further comprises a leader block receiver section that is configured to receive and position the leader block while the leader block is connected to the magnetic tape. Upon receiving the leader block, the first curved surface of the take-up reel and the second curved surface of the leader block form a substantially smooth winding substrate for the magnetic tape.

In one embodiment of the present invention, the leader block forms the connection with the magnetic tape by engaging a leader pin assembly that is attached to the magnetic tape. The threading apparatus further includes a leader tape having a first end connected to the take-up reel and a second end connected to the leader block. The leader block receiver section is further configured to receive the leader block by winding the leader tape onto the first curved surface of the take-up reel during a threading operation.

In a second embodiment of the present invention, the leader block also forms the connection with the magnetic tape by engaging a leader pin assembly that is attached to the magnetic tape. The threading apparatus further comprises a leader drum and a leader tape. The take-up reel defines a hollow inner section and further comprises a leader tape opening. Disposed within the take-up reel hollow inner section is the leader drum which is concentrically mounted and at least partially rotatable with respect to the take-up reel. The leader tape has a first end connected to the leader drum and a second end connected to the leader block and is arranged to pass through the leader block receiver section and through the leader tape opening. The leader tape opening is adapted to allow the leader tape to pass through the take-up reel upon being wound onto the leader drum while not allowing the leader block to pass through the take-up reel after the leader block has been received into the leader block receiver section.

DETAILED DESCRIPTION OF THE INVENTION

As previously indicated, one popular technique for threading tape from a single reel cartridge can result in unacceptable variations in transport machine reliability. This is because the smoothness of the take-up reel winding substrate is in part a function of a component from the cartridge. As will be illustrated in the following exemplary embodiments, the present invention provides a new threading technique wherein the smoothness of the take-up reel winding substrate is only a function of components that are part of the transport machine. As will be discussed in detail below, this allows the transport machine manufacturer to apply their own quality control processes to these components (both individually and as an assembly) in order to improve transport machine reliability.

Figure 1:
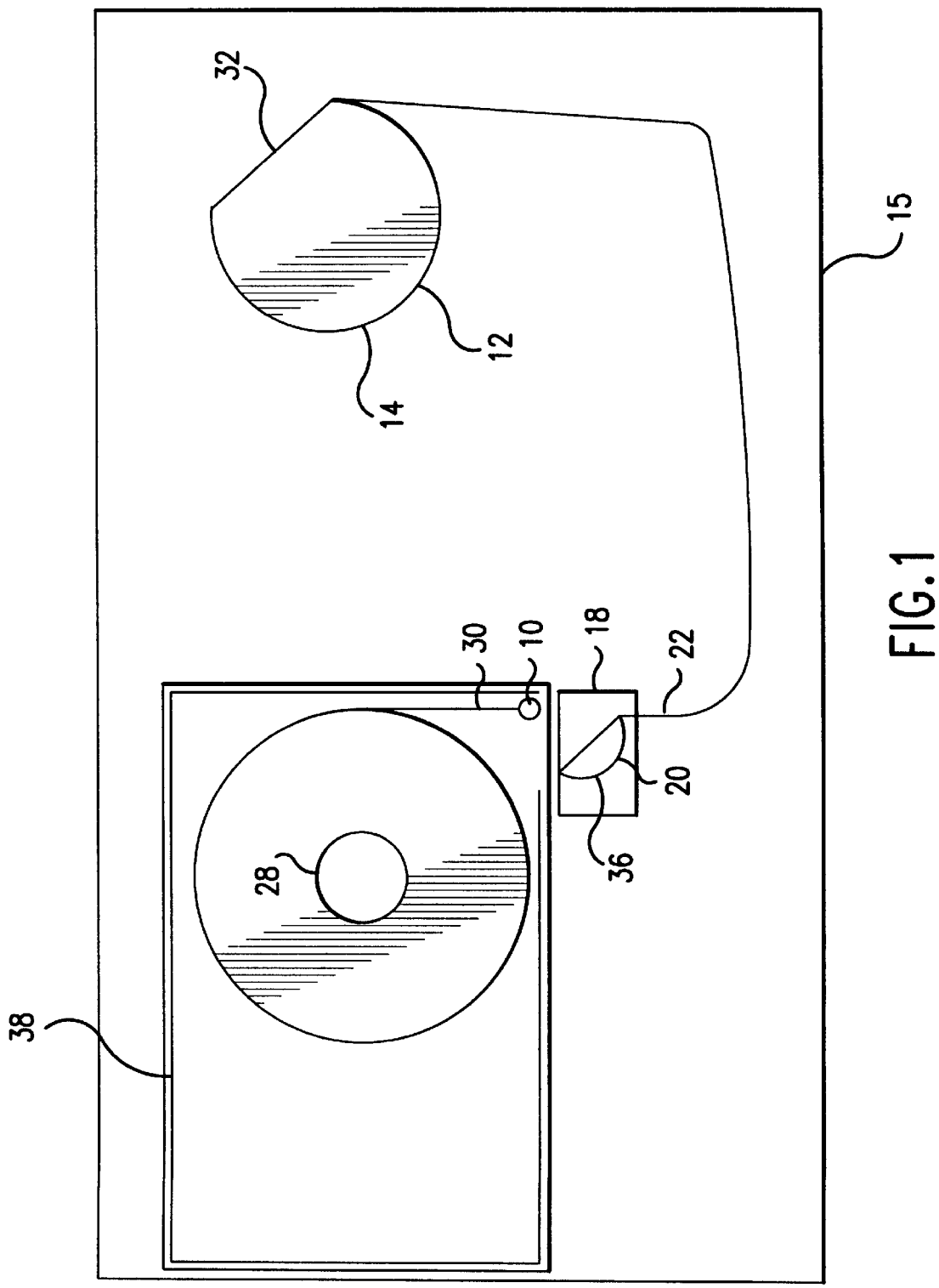
FIG. 1 depicts a first exemplary embodiment of the present invention.

FIG. 1 depicts a first exemplary embodiment of the present invention in the form of Transport Machine (Machine) 15 having threading apparatus. It is noted that FIG. 1 is not to scale and is a simplified view of Machine 15 and depicts only the components necessary to initially describe the present embodiment. Other components of Machine 15, such as the tape cartridge load and eject mechanism (load-eject mechanism), read-write heads, motors and control circuitry are well known in the art and are therefore not depicted.

Machine 15 is able to accept single reel cartridges such as Tape Cartridge 38. Tape Cartridge 38 is shown after being loaded into Machine 15 but before a threading operation and includes Source Reel 28 with Magnetic Tape 30 wrapped thereon. Attached to the free end of Magnetic Tape 30 is Coupler 10. Coupler 10 provides an appropriate attachment interface for the threading apparatus of Machine 15 and is further described below.

In this present embodiment, Coupler 10 is similar to a leader pin assembly which is described in the co-pending U.S. Patent application entitled "TAPE LEADER PIN ASSEMBLY AND METHOD FOR MAKING THE SAME", having application serial number 09055016 and incorporated herein by reference. It is noted that this co-pending application also describes a technique that may be used to house and seat Coupler 10 in Tape Cartridge 38 (see, for example, FIG. 5 of that application).

The threading apparatus includes Take-up Reel 12, Leader Tape 22, and Leader Block 20. Take-up Reel 12 includes Curved Surface 14 and Leader Block Receiver Section (Receiver Section) 32. Curved Surface 14 is adapted so as to form a first portion of the take-up reel winding substrate.

Leader Tape 22 is constructed of a flexible material and has a first end connected to Leader Block 20 and a second end connected to Curved Surface 14. Prior to a threading operation and as depicted in FIG. 1, Leader Tape 22 is positioned within a guide assembly (not shown) along the threading path of Machine 15.

Figure 2A:
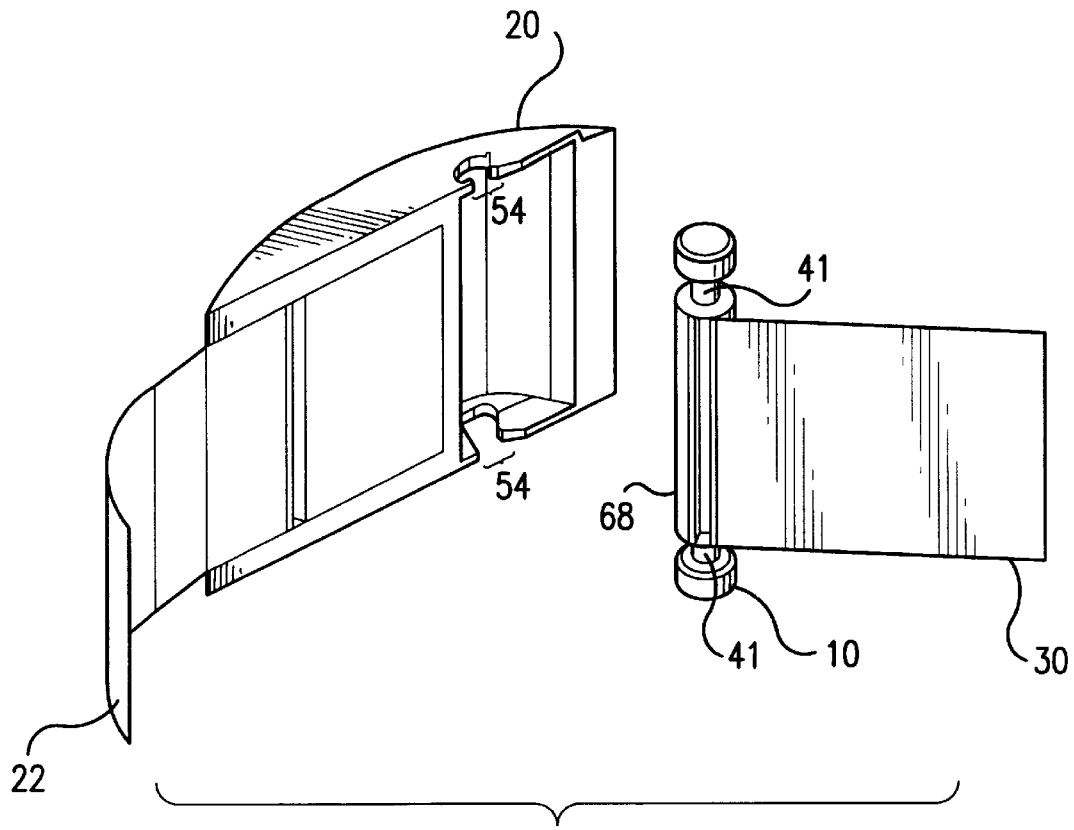
FIG. 2 provides a perspective view of a leader block and a coupler.
Figure 2B:
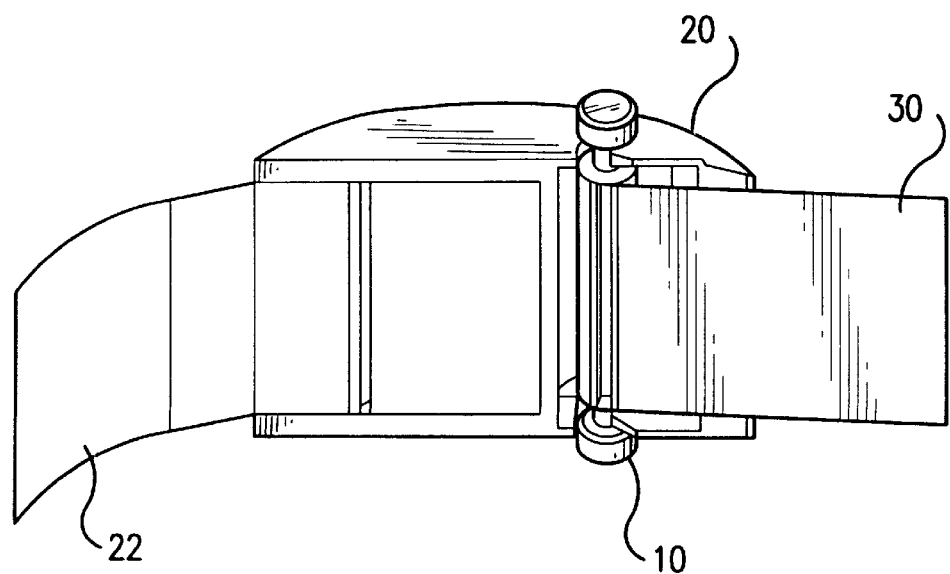

Leader Block 20 includes Curved Surface 36 adapted to form the second portion of the take-up reel winding substrate and certain features, referred to herein as "connection features", that are used to establish a connection with Coupler 10 during a threading operation. To further illustrate these features, FIG. 2 provides a perspective view of Leader Block 20 and Coupler 10 both unconnected (FIG. 2A) and connected (FIG. 2B). The connection features of Leader Block 20 include a pair of Grooves 54. Grooves 54 are adapted to closely receive Recessed Sections 41 of Coupler 10.

In addition to the threading apparatus, Machine 15 further includes Engagement Mechanism 18. As further discussed below, Engagement Mechanism 18 is adapted to position Leader Block 20 at the start of a threading operation so as to establish a connection between Leader Block 20 and Coupler 10. It is noted that the particular implementation of Engagement Mechanism 18 is not important for an understanding of the present invention and various techniques can be used to accomplish its function. For this reason the details of Engagement Mechanism 18 are not depicted in FIG. 1.

Referring now to both FIG. 1 and FIG. 2, prior to the insertion of Tape Cartridge 38 into Machine 15, Leader Block 20 is maintained in a preconnective position (as depicted in FIG. 1) by Engagement Mechanism 18. While in this pre-connective position, a cartridge may be loaded and ejected without interference from leader Block 20.

After Tape Cartridge 38 has been loaded and upon the start of the threading operation, Engagement Mechanism 18 operates to move Leader Block 20 from its pre-connective position along a pre-defined path so as to cause Leader Block 20 to engage Coupler 10 in a manner such that Recessed Sections 41 of Coupler 10 are received and properly seated into Grooves 54. This establishes a connection between Coupler 10 and Leader Block 20. It is noted that a locking mechanism may further be required to keep Recessed Sections 41 of Coupler 10 properly seated within Grooves 54. This is dependant upon the forces that are applied to Coupler 10 and Leader Block 20 during the rest of the threading operation.

Figure 3B:
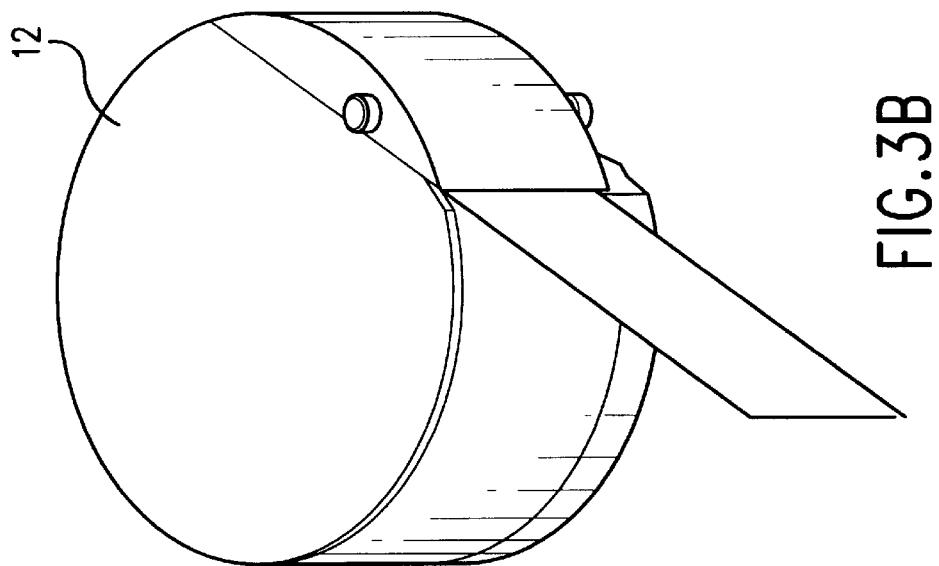
FIG. 3 illustrates the manner in which the leader block is received and positioned onto the take-up reel during a threading operation.
Figure 3A:
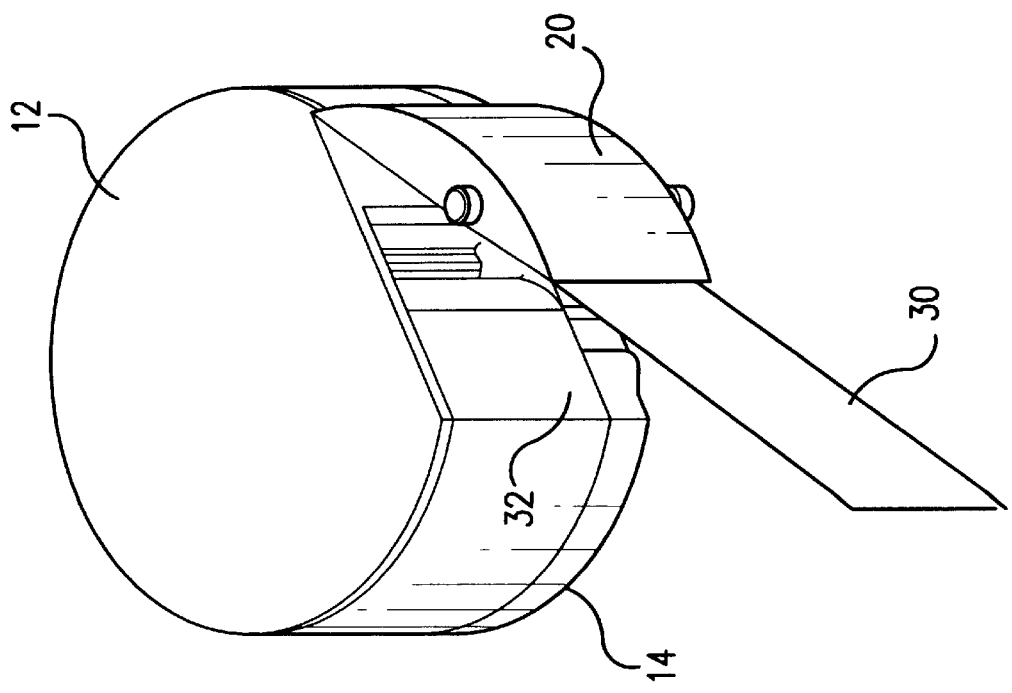

After the connection between Leader Block 20 and Coupler 10 is established, threading of Magnetic Tape 30 is accomplished by placing Take-up Reel 12 in a winding condition. This operates to wrap Leader Tape 22 onto Curved Surface 14 thereby pulling Magnetic Tape 30 (via Leader Block 20 and Coupler 10) through the threading path. Leader Tape 22 and Leader Block 20 are adapted so that after Leader Tape 22 is completely wrapped onto Curved Surface 14, further winding of Take-up Reel 12 causes Leader Block 20 to be positioned onto Receiver Section 32. This important aspect of the threading operation is illustrated in FIG. 3. FIG. 3A shows Take-up Reel 12 and Leader Block 20 immediately before (FIG. 3A) and immediately after (FIG. 3B) Leader Block 20 is positioned onto Receiver Section 32. As shown in FIG. 3B, after Leader Block 20 is so positioned, Curved Surface 36 and Curved Surface 14 form a substantially smooth and continuous winding substrate for Magnetic Tape 30.

After Leader Block 20 has been positioned as shown in FIG. 3B, the threading operation is complete and further winding of Take-up Reel 12 results in Magnetic Tape 30 being wrapped onto Take-up Reel 12. Further transport of Magnetic Tape 30 is accomplished by the coordinated winding and unwinding of Magnetic Tape 30 to and from Take-up Reel 12. Importantly, it can be seen that during the transport of Magnetic Tape 30, the take-up reel winding substrate for Magnetic Tape 30 consists only of components that are part of the threading apparatus (i.e., Take-up Reel 12, Leader Block 20 and Leader Tape 22).

In order to eject Tape Cartridge 38 from Machine 15, the steps just described in large part are reversed. First, Source Reel 28 is placed in a winding condition. During this operation, Leader Block 20 is removed from Take-up Reel 12, moved through the threading path and into Tape Cartridge 38 so that Coupler 10 is appropriately seated within Tape Cartridge 38. Engagement Mechanism 18 then operates to re-engage Leader Block 20 and to urge Leader Block 20 away from Coupler 10 while Source Reel 28 is locked. This causes Leader Block 20 to separate from Coupler 10. Leader Block 20 is then moved back to the pre-connective position. At this point Tape Cartridge 38 is free to be ejected from Machine 15.

As previously indicated, transport machines that make use of prior art threading techniques can experience unacceptable variations in reliability due to the smoothness of the take-up reel winding substrate being partly a function of a component in the tape cartridge. It can now be seen that the present invention solves this problem by providing a transport machine wherein the smoothness of the take-up reel winding substrate is only a function of components that are part of the transport machine. Thus, the present invention allows the transport machine manufacturer to apply their own quality control processes to these components (individually or as an assembly) in order to provide transport machines that have improved reliability over the prior art.

In the embodiment just described, the leader block is essentially a half moon shape and is moved through the threading path of the transport machine by a leader tape attached to the periphery of the take-up reel. It is noted that in other embodiments the leader block is shaped differently and other techniques may be used to move the leader block through the transport machine.

Figure 4:
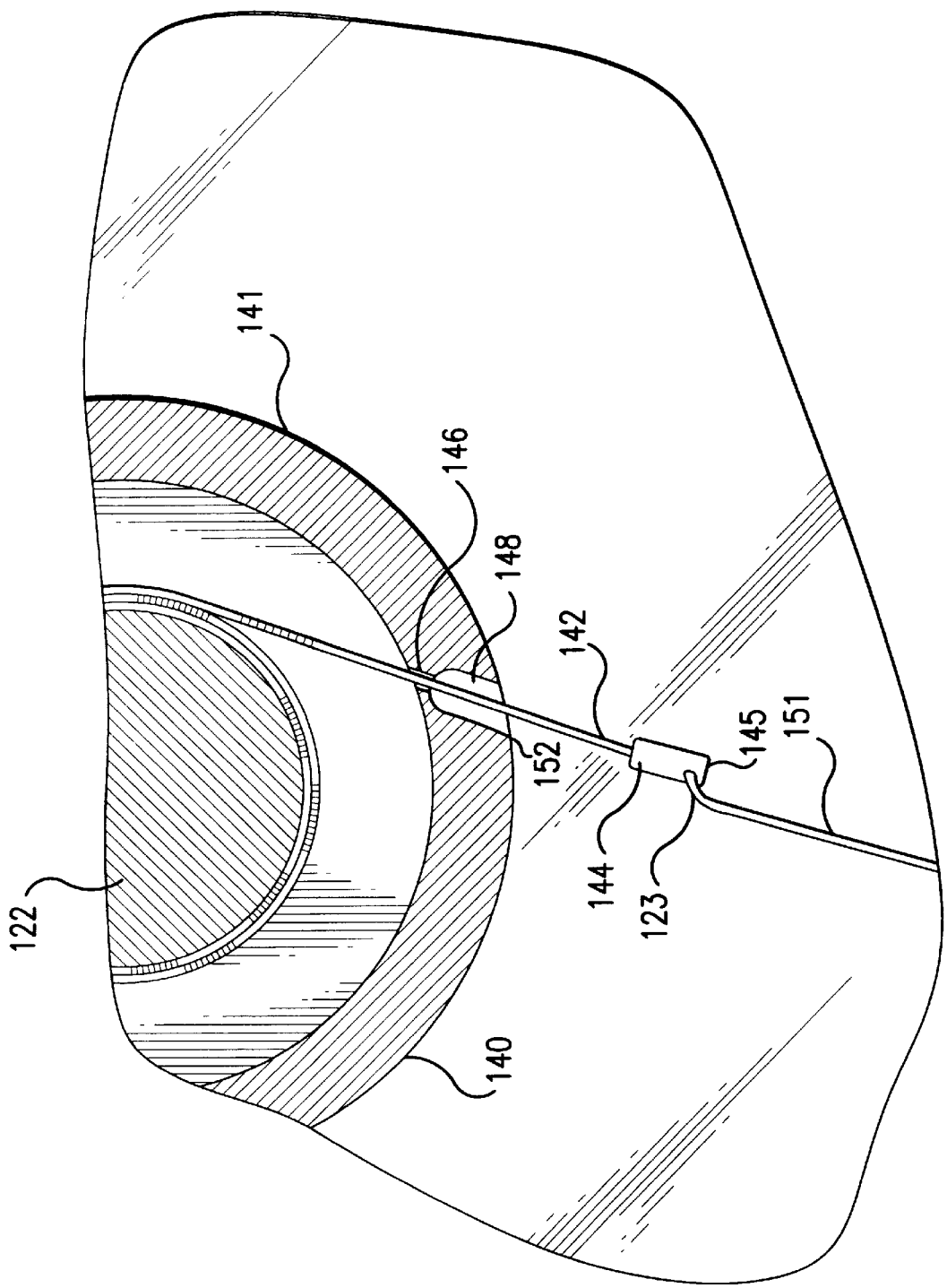
FIG. 4 depicts a second exemplary embodiment of the present invention.

To illustrate this, FIG. 4 depicts a second exemplary embodiment in the form of threading apparatus. As shown, the inventive threading apparatus includes Take-up Reel 140, Leader Tape 142, Leader Drum 122 and Leader Block 144. Here the inventive threading apparatus is shown during a threading operation of Magnetic Tape 151 from a single reel cartridge (not shown). Attached to the free end of Magnetic Tape 151 is Coupler 123. At the start of a threading operation, a connection is established between Leader Block 144 and Coupler 123 in a similar manner as that described in the first embodiment.

Take-up Reel 140 includes Curved Surface 141, Leader Block Receiver Section (Receiver Section) 148 and Leader Tape Opening (Tape Opening) 146. Curved Surface 141 is adapted so as to form a first portion of the take-up reel winding substrate. Tape Opening 146 is sized to allow Leader Tape 142 to pass therethrough while not allowing Leader Block 144 to pass therethrough.

As shown, Take-up Reel 140 defines a hollow inner section. Disposed within this inner section is Leader Drum 122 which is concentrically mounted and at least partially rotatable with respect to Take-up Reel 140. Leader Tape 142 is constructed of flexible material and has a first end that is connected to the outer periphery of Leader Drum 122 and a second end that is connected to Leader Block 144. Leader Tape 142 is arranged so as to pass through Receiver Section 148 and Tape Opening 146.

Leader Block 144 includes Curved Surface 145 adapted to form the second portion of the take-up reel winding substrate. Leader Block 144 further includes connection features that are used to establish a connection with Coupler 123 during a threading operation. These features are similar to the connection features of Leader Block 20 described in the first exemplary embodiment.

Prior to the threading operation, Leader Tape 142 is extended along the threading path of the transport machine. At the start of the threading operation a connection is established between Leader Block 144 and Coupler 123. Leader Drum 122 is then placed in a winding condition while rotation of Take-up Reel 140 is prevented. This causes Leader Tape 142 to be drawn through Receiver Section 148 and Tape Opening 146 and wrapped onto Leader Drum 122. As a result, Magnetic Tape 151 (via Leader Block 144 and Coupler 123) is pulled through the threading path until Leader Block 144 is received by Receiver Section 148. Leader Block 144 is adapted such that when so received, Curved Surface 145 and Curved Surface 141 form a substantially smooth and continuous take-up reel winding substrate for Magnetic Tape 151.

It can be seen that the technique just described for moving Leader Block 144 through the threading path of a transport machine is similar to that described in the co-pending application entitled "TAPE THREADING APPARATUS" having application Ser. No. 09121766. That application is incorporated herein by reference.

After Leader Block 144 has been received into Receiver Section 148, the threading operation is complete and Take-up Reel 140 is released so as to permit rotation. After being released, Take-up Reel 140 can then be placed in a winding condition by further rotating Leader Drum 122 so as to place a tensile force on Leader Tape 142. This causes Leader Tape 142 to apply an eccentric force to Take-up Reel 140 (via Leader Block 144) thereby causing Take-up Reel 140 to rotate so that Magnetic Tape 151 is wrapped thereon. Take-up Reel 140 further includes Relief Radius 152 that is adapted to provide for a smooth transition of Magnetic Tape 151 from Leader Block 144 to Curved Surface 141.

After the threading operation is complete, transport of Magnetic Tape 151 is then accomplished by the coordinated winding and unwinding of Magnetic Tape 151 onto Take-up Reel 140. Importantly, it can be seen that during the transport of Magnetic Tape 151, the take-up reel winding substrate for Magnetic Tape 151 consists only of components that are part of the threading apparatus that resides in the transport machine (i.e., Take-up Reel 140 and Leader Block 144).

As stated above, transport machines that make use of prior art threading techniques can experience unacceptable variations in reliability due to the smoothness of the take-up reel winding substrate being partly a function of a component in the tape cartridge. This second embodiment provides a solution to this problem by providing threading apparatus that may be incorporated into a transport machine. The threading apparatus provides for a take-up reel winding substrate having a smoothness that is only a function of components that are part of the threading apparatus. Thus, the manufacturer can apply their own quality control processes to these components (individually or as an assembly) to provide transport machines that have improved reliability.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. In a tape transport machine, threading apparatus comprising:
   (a) a take-up reel comprising a first curved surface and a first substantially planar surface, said first curved surface having a first end and a second end and said first planar surface disposed between said first end and said second end; and
   (b) a leader block adapted to establish a connection with a first tape located in a tape cartridge and comprising a second curved surface and a second substantially planar surface, said second curved surface having a first leader block end and a second leader block end and said second planar surface disposed between said first leader block end and said second leader block end, said leader block connected to said take-up reel; and (c) wherein said first planar surface further configured to receive said second planar surface in a manner so that said first curved surface and said second curved surface form a substantially smooth winding substrate for said first tape.

2. The threading apparatus of claim 1, wherein said leader block forms said connection with said first tape by engaging a coupler in said tape cartridge and attached to said first tape.

3. The threading apparatus of claim 2, wherein said first tape comprises magnetic tape.

4. The threading apparatus of claim 3, wherein said tape cartridge comprises a single reel cartridge.

5. The threading apparatus of claim 4, further comprising a leader tape having a first tape end connected to said take-up reel and a second tape end connected to said leader block; and wherein said first planar surface further configured to receive said second planar surface, thereby placing said leader block into said mated position, by winding said leader tape onto said first curved surface.

6. The threading apparatus of claim 5, wherein said coupler comprises a leader pin assembly.

7. A tape transport machine comprising threading apparatus for threading a first tape from a tape cartridge through a threading path, said threading apparatus comprising:

(a) leader block means for establishing a connection with said first tape and including a first curved surface and a first substantially planar surface, said first curved surface including a first end and a second end and said first planar surface positioned substantially between said first end and said second end; and (b) means for winding said first tape, said winding means comprising a second curved surface and a leader block receiver section, said second curved surface including a third end and a fourth end and said leader block receiver section including a second substantially planar surface disposed between said third end and said fourth end, said second planar surface configured to receive said first planar surface so that said first curved surface and said second curved surface form a substantially smooth winding substrate for said first tape.

8. The tape transport machine of claim 7, wherein said leader block means establishes a connection with said first tape by engaging a coupler attached to said first tape in said tape cartridge.

9. The tape transport machine of claim 8, further comprising a leader tape having a first end connected to said leader block means and a second end connected to said winding means; and wherein said leader block receiver section is further configured to receive said second planar surface by winding said leader tape onto said first curved surface.

10. The tape transport machine of claim 9, wherein said first tape comprises a magnetic tape.

11. The tape transport machine of claim 9, wherein said winding means further for winding said leader tape; and wherein said leader tape further adapted to move said first tape through said threading path during a threading operation by said winding means said winding said leader tape onto said first curved surface.

12. The tape transport machine of claim 11, wherein said coupler comprises a leader pin assembly.

13. The tape transport machine of claim 10, wherein said tape cartridge comprises a single reel cartridge.

* * * * *